United States Patent
Hatakeyama

(10) Patent No.: US 11,070,161 B2
(45) Date of Patent: Jul. 20, 2021

(54) ELECTRIC-MOTOR DRIVING DEVICE AND REFRIGERATION-CYCLE APPLICATION APPARATUS INCLUDING ELECTRIC-MOTOR DRIVING DEVICE

(71) Applicant: Mitsubishi Electric Corporation, Tokyo (JP)

(72) Inventor: Kazunori Hatakeyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 64 days.

(21) Appl. No.: 16/465,174

(22) PCT Filed: Mar. 9, 2017

(86) PCT No.: PCT/JP2017/009532
§ 371 (c)(1),
(2) Date: May 30, 2019

(87) PCT Pub. No.: WO2018/163363
PCT Pub. Date: Sep. 13, 2018

(65) Prior Publication Data
US 2020/0162009 A1 May 21, 2020

(51) Int. Cl.
*H02P 29/024* (2016.01)
*H02P 25/18* (2006.01)
(Continued)

(52) U.S. Cl.
CPC .......... *H02P 29/0241* (2016.02); *F25B 31/02* (2013.01); *H02P 25/184* (2013.01); *H02P 27/06* (2013.01)

(58) Field of Classification Search
CPC .... H02P 29/0241; H02P 25/184; H02P 27/06; H02P 29/024; H02P 27/04; H02P 27/00;
(Continued)

(56) References Cited

U.S. PATENT DOCUMENTS 8,045,301 B2 * 10/2011 Shiba ........................ B60L 9/18
361/23
8,248,010 B2 * 8/2012 Mukai ................. H02P 29/0241
318/400.21

(Continued)

FOREIGN PATENT DOCUMENTS

EP  2 738 495 A1  6/2014
JP  2008-228513 A  9/2008
(Continued)

OTHER PUBLICATIONS

Extended EP Search Report dated May 6, 2019 issued in corresponding EP patent application No. 17885441.0.
(Continued)

*Primary Examiner* — Antony M Paul
(74) *Attorney, Agent, or Firm* — Posz Law Group, PLC

(57) ABSTRACT

An electric-motor driving device includes an inverter connected to terminals connected to windings of an electric motor including the windings, the inverter applying an alternating-current voltage to the electric motor, a switching unit connected to the terminals and capable of switching a connection state between the terminals, a detecting unit that detects at least one of a voltage and an electric current of the inverter, and a control unit that determines on the basis of a detection value detected by the detecting unit that an abnormality occurs in the switching unit and controls the inverter to short-circuit at least two of the terminals.

6 Claims, 14 Drawing Sheets

(51) Int. Cl.
*H02P 27/06* (2006.01)
*F25B 31/02* (2006.01)

(58) Field of Classification Search
CPC ...... H02P 1/00; H02P 1/04; H02P 3/12; H02P 3/22; H02P 3/00; H02P 21/00; H02P 23/00; H02P 2201/07; H02P 2201/09; F25B 1/02; H02M 7/1626; H02M 3/16; H02M 1/32; H02M 3/33584
See application file for complete search history.

(56) References Cited

U.S. PATENT DOCUMENTS

| | | | | |
|---|---|---|---|---|
| 8,264,190 B2 * | 9/2012 | Suzuki | ........... | H02P 29/032 |
| | | | | 318/724 |
| 8,633,664 B2 * | 1/2014 | Endoh | ........... | B62D 5/0487 |
| | | | | 318/400.22 |
| 8,872,455 B2 * | 10/2014 | Tremel | ........... | H02P 29/0241 |
| | | | | 318/400.22 |
| 9,130,489 B2 * | 9/2015 | Kitano | ........... | H02P 6/12 |
| 9,654,048 B2 * | 5/2017 | West | ........... | H02M 1/32 |
| 9,771,099 B2 * | 9/2017 | Mori | ........... | B62D 5/0484 |
| 9,889,880 B2 * | 2/2018 | Mori | ........... | H02P 27/06 |
| 10,232,875 B2 * | 3/2019 | Kikuchi | ........... | H02P 27/06 |
| 2010/0036555 A1 * | 2/2010 | Hosoda | ........... | B60L 3/04 |
| | | | | 701/22 |
| 2017/0264197 A1 * | 9/2017 | Kubouchi | ........... | H02M 3/158 |

FOREIGN PATENT DOCUMENTS

| | | |
|---|---|---|
| JP | 2012-227981 A | 11/2012 |
| JP | 2016-063631 A | 4/2016 |

OTHER PUBLICATIONS

International Search Report dated May 23, 2017 issued in corresponding international patent application No. PCT/JP2017/009532 (and English machine translation thereof).

* cited by examiner

Y WIRE CONNECTION

Δ WIRE CONNECTION

ELECTRIC-MOTOR DRIVING DEVICE AND REFRIGERATION-CYCLE APPLICATION APPARATUS INCLUDING ELECTRIC-MOTOR DRIVING DEVICE

CROSS REFERENCE TO RELATED APPLICATION

This application is a U.S. national stage application of International Patent Application No. PCT/JP2017/009532 filed on Mar. 9, 2017, the disclosure of which is incorporated herein by reference.

TECHNICAL FIELD

The present invention relates to an electric-motor driving device, and a refrigeration-cycle application apparatus including the electric-motor driving device.

BACKGROUND

In a winding switching device of an alternating-current electric motor, there has been proposed a technology for providing a switch capable of switching a first state in which power that is supplied from an inverter is guided to, among a first armature winding and a second armature winding, the first armature winding, and a second state in which the supplied power from the inverter is guided to both of the first armature winding and the second armature winding, and forming a current path for reducing a voltage applied to a plurality of armature windings according to an abnormality detection state (see, for example, Patent Literature 1).

Patent Literature

Patent Literature 1: Japanese Patent Application Laid-Open No. 2012-227981

In the technology described in Patent Literature 1, when a relay, which is a type of an electromagnetic contactor, is used for a switch for switching three-phase lines connected to an armature winding, it is likely that a deficiency such as welding of a relay contact is caused when the switch is operated in a state in which an overcurrent is flowing to the armature winding. Furthermore, because a fixed delay time occurs until a contact side of the relay operates, it is likely that protection cannot be performed when a failure due to a protection operation delay occurs or the switch itself breaks down.

On the other hand, when a contactor is used for the switch for switching the three-phase lines, an increase in size and an increase in cost occur. Deterioration in terms of not only a reduction in the weight of an electric-motor driving device but also cost is inevitable.

When an insulated gate-type bipolar transistor is used for the switch, a loss corresponding to a current value occurs when the switch is turned on. There is a concern about deterioration in efficiency. Further, when three insulated gate-type bipolar transistors are used to switch the three-phase lines, the three insulated gate-type bipolar transistors are not simultaneously turned on because of fluctuation in switching timing. Therefore, because a normal current path is not formed, it is likely that a failure is rather caused.

SUMMARY

The present invention has been devised in view of the above, and an object of the present invention is to obtain an electric-motor driving device with an improved protecting function during abnormality.

An electric-motor driving device according to an aspect of the present invention includes: an inverter connected to terminals connected to windings of an electric motor including the windings, the inverter applying an alternating-current voltage to the electric motor; a switching unit to be capable of switching a connection state between the terminals, the switching unit being connected to the terminals; and a detecting unit to detect at least one of a voltage on an input side of the inverter and an electric current of the inverter. The electric-motor driving device according to the present invention further includes a control unit to determine on the basis of a detection value detected by the detecting unit that an abnormality occurs in the switching unit and control the inverter to short-circuit at least two of the terminals.

The electric-motor driving device according to the present invention achieves an effect that a protecting function during abnormality is improved.

DETAILED DESCRIPTION

Electric-motor driving devices and refrigeration-cycle application apparatuses according to embodiments of the present invention are explained in detail below with reference to the drawings. Note that the present invention is not limited by the embodiments.

First Embodiment

Figure 1:
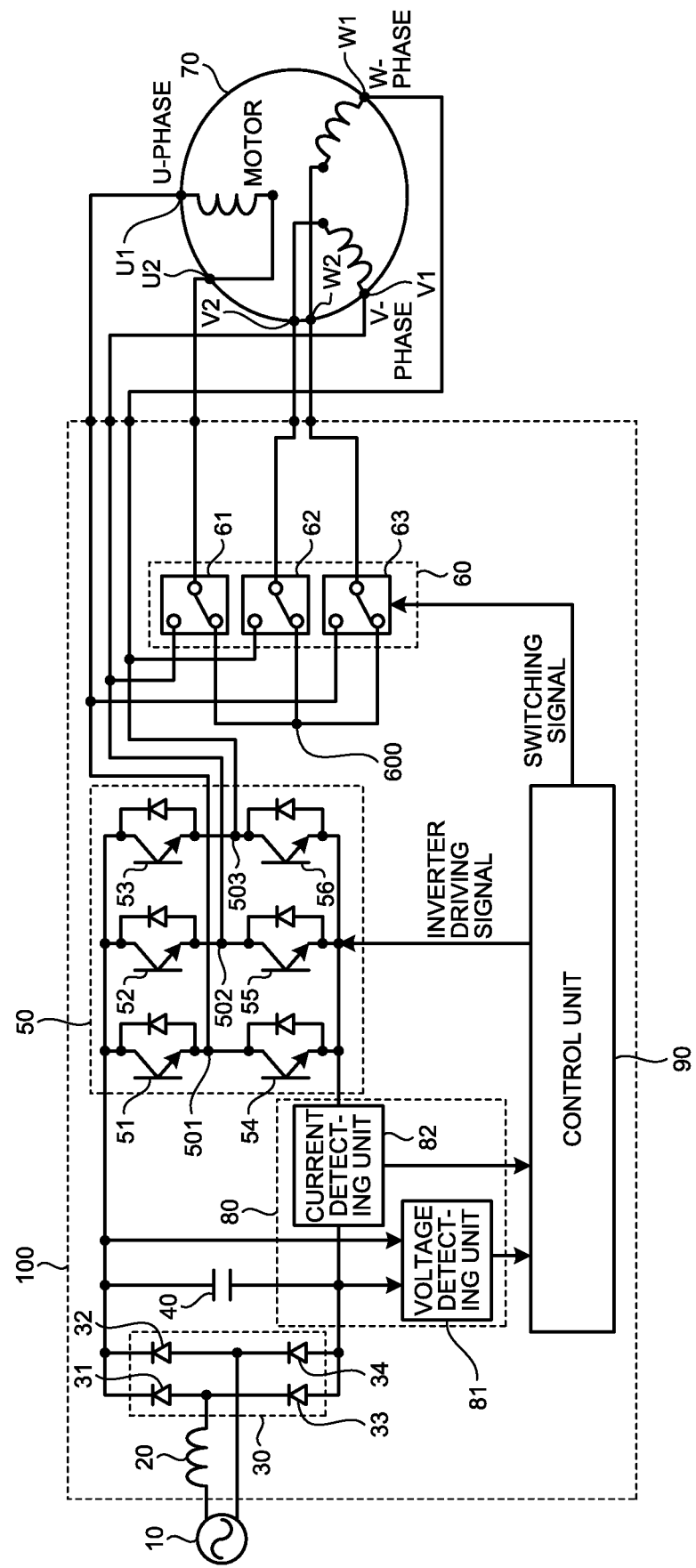
FIG. 1 is a diagram illustrating a configuration example of an electric-motor driving device according to a first embodiment of the present invention.

FIG. 1 is a diagram illustrating a configuration example of an electric-motor driving device 100 according to a first embodiment of the present invention. The electric-motor driving device 100 is connected to an alternating-current power supply 10. The electric-motor driving device 100 includes a reactor 20, a rectifying unit 30, a capacitor 40, an inverter 50, a switching unit 60, a detecting unit 80, and a control unit 90 and drives an electric motor 70. The rectifying unit 30 is configured by rectifying elements 31 to 34 such as diodes. The inverter 50 is configured from switching elements 51 to 56 to each of which a diode, which is a rectifying element, is connected. The switching unit 60 is configured from a plurality of switching devices 61 to 63, which are a plurality of switches. The switching devices 61 to 63 are illustrated as "c" contact-type relays as an example.

The electric motor 70 includes a terminal U1 and a terminal U2 that are connected to a U-phase coil, which is a U-phase winding, a terminal V1 and a terminal V2 that are connected to a V-phase coil, which is a V-phase winding, and a terminal W1 and a terminal W2 that are connected to a W-phase coil, which is a W-phase winding. A terminal 501, which is a connection point of the switching elements 51 and 54, and the terminal U1 are connected. A terminal 502, which is a connection point of the switching elements 52 and 55, and the terminal V1 are connected. A terminal 503, which is a connection point of the switching elements 53 and 56, and the terminal W1 are connected. The switching device 61 is connected to the terminal U2. The switching device 62 is connected to the terminal V2. The switching device 63 is connected to the terminal W2.

The switching device 61 is switched to a first direction to thereby connect the terminal U2 and the terminal 502 and is switched to a second direction to thereby connect the terminal U2 and a terminal 600. The switching device 62 is switched to the first direction to thereby connect the terminal V2 and the terminal 503 and is switched to the second direction to thereby connect the terminal V2 and the terminal 600. The switching device 63 is switched to the first direction to thereby connect the terminal W2 and the terminal 501 and is switched to the second direction to thereby connect the terminal W2 and the terminal 600. It is possible to switch a winding state, which is a state of windings of the electric motor 70, according to a connection state of the switching devices 61 to 63. Specifically, it is possible to switch the winding state of the electric motor 70 to Y wire connection or Δ wire connection according to the connection state of the switching devices 61 to 63. Note that the winding state of the electric motor 70 switchable by the switching unit 60 is not limited to the Y wire connection or the Δ wire connection.

In the electric-motor driving device 100, an alternating-current voltage from the alternating-current power supply 10 is supplied to the capacitor 40 via the reactor 20 and the rectifying unit 30 and a direct-current voltage is generated. The direct-current voltage is supplied to the inverter 50 that is connected to the capacitor 40 in parallel. The inverter 50 operates to apply a target alternating-current voltage to the electric motor 70, the winding state of which is switchable by the switching unit 60.

The detecting unit 80 is configured from a voltage detecting unit 81 that detects a direct-current voltage on an input side of the inverter 50 and a current detecting unit 82 that detects an electric current flowing to the inverter 50. The control unit 90 operates the switching unit 60 on the basis of the voltage or the electric current that are detected by the detecting unit 80 or both of the voltage and the electric current. That is, the control unit 90 outputs a switching signal to the switching unit 60 to thereby operate the switching devices 61 to 63 to switch the winding state of the electric motor 70 to the Y wire connection or the Δ wire connection. Further, the control unit 90 outputs an inverter driving signal to the inverter 50 such that the inverter 50 outputs a target voltage. Consequently, the electric-motor driving device 100 can apply the target voltage to the electric motor 70 and drive the electric motor 70. Further, the control unit 90 controls the inverter 50 on the basis of the voltage or the electric current that are detected by the detecting unit 80 or both of the voltage and the electric current and executes a protection operation explained below.

Figure 2:
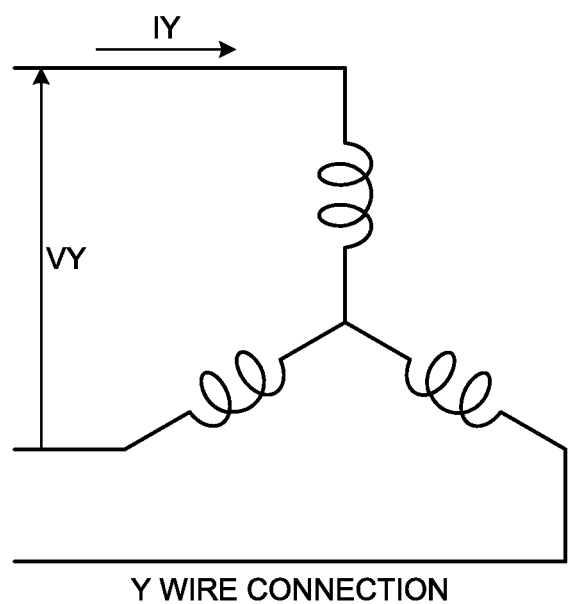
FIG. 2 is a connection diagram representing a winding state of Y wire connection of the electric motor according to the first embodiment.
Figure 3:
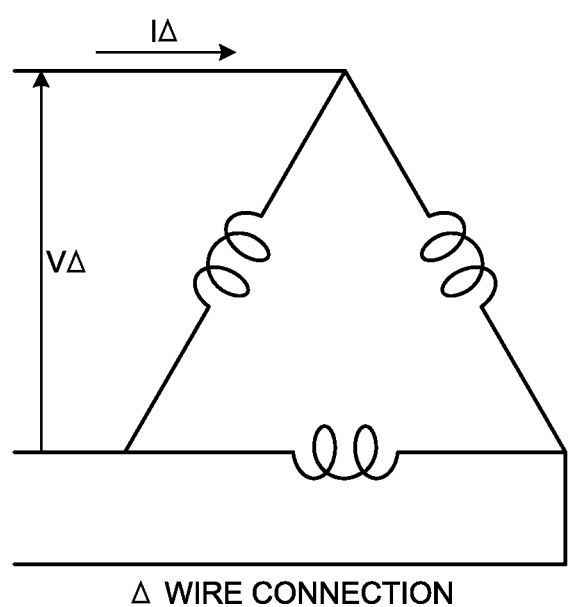
FIG. 3 is a connection diagram representing a winding state of Δ wire connection of the electric motor according to the first embodiment.

FIG. 2 is a connection diagram representing a winding state of the Y wire connection of the electric motor 70 according to the first embodiment. FIG. 3 is a connection diagram representing a winding state of the Δ wire connection of the electric motor 70 according to the first embodiment. When all the switching devices 61 to 63 of the switching unit 60 are switched to the second direction, that is, the side of the terminal 600 as illustrated in FIG. 1, the electric motor 70 is in the winding state of the Y wire connection. When all the switching devices 61 to 63 illustrated in FIG. 1 is switched to the first direction, the electric motor 70 changes to the winding state of the Δ wire connection. In the following explanation, a reason for switching the winding state of the electric motor 70 between the Y wire connection and the Δ wire connection is explained with reference to FIG. 2 and FIG. 3.

In FIG. 2, an inter-wire voltage of the electric motor 70 in the Y wire connection is defined as VY and an electric current flowing to the electric motor 70 in the Y wire connection is defined as IY. In FIG. 3, an inter-wire voltage of the electric motor 70 in the Δ wire connection is defined as VΔ and an electric current flowing to the electric motor 70 in the Δ wire connection is defined as IΔ. Then, relations of $VY=\sqrt{3} \times V\Delta$ and $\sqrt{3} \times IY=I\Delta$ are obtained. That is, the electric current is larger in the Δ wire connection than in the Y wire connection. On the other hand, it is possible to reduce a voltage necessary for driving. Therefore, the switching devices 61 to 63 of the switching unit 60 are capable of switching a value of a counterelectromotive voltage generated between the terminals of the electric motor 70 at the same rotation speed.

Incidentally, according to energy saving of electric motors in recent years, a brushless DC motor including a permanent magnet is widely used as a rotor configuring the electric motor 70. When such a motor is used, the counterelectromotive voltage increases when a rotation speed increases. A voltage value necessary for driving increases. When it is attempted to drive the electric motor 70 in the Y wire connection with the inverter 50, a voltage necessary for the driving increases when the rotation speed increases. Therefore, measures for reducing a magnetic force of the permanent magnet to reduce the counterelectromotive voltage or unwinding a winding of a stator are necessary. When such measures are taken, an electric current flowing to the electric motor 70 and the inverter 50 increases and deterioration of energy conversion efficiency is inevitable. Therefore, when the electric motor 70 is driven at a high rotation speed, the winding state of the electric motor 70 is switched from the Y wire connection to the Δ wire connection. Consequently, the voltage necessary for the driving of the electric motor 70 decreases to $1/\sqrt{3}$. Therefore, it is possible to continue the operation without taking the measures for reducing the magnetic force or unwinding the winding.

For example, the electric motor 70 is used in an air conditioner. In an air conditioner in recent years, when a difference between a set temperature and a room temperature at the start of operation is large, the electric motor 70 operates to bring the room temperature close to the set temperature by increasing the rotation speed of the electric motor 70 until the room temperature approaches the set temperature. However, in a state in which the set temperature and the room temperature generally coincide, the rotation speed of the electric motor 70 is reduced to perform operation. A ratio of an operation time period in which the rotation speed is reduced in an entire operation time period is large. Therefore, when the electric motor 70 is driven at a low rotation speed with a long operation time period, because a driving voltage is low, the electric motor 70 is switched to the Y wire connection capable of reducing an electric current. When the electric motor is driven at the high rotation speed, the electric motor 70 is switched to the Δ wire connection. Consequently, by switching the electric motor 70 to the Y wire connection at the low rotation speed, a current value can be reduced to $1/\sqrt{3}$ compared with the Δ wire connection. Further, it is possible to perform optimum design of the winding such that the electric motor 70 can be driven only at the low rotation speed. Therefore, compared with the conventional design of the number of turns for driving the electric motor 70 in all rotation speed regions only with the Y wire connection, it is possible to further reduce a current value. As a result, it is possible to reduce a loss of the inverter 50. It is possible to contribute to improvement of efficiency of energy conversion.

At the high rotation speed, by switching the electric motor 70 to the Δ wire connection, it is possible to drive the electric motor 70 with a $1/\sqrt{3}$ voltage with respect to the Y wire connection that is designed to be capable of driving the electric motor 70 at only the low rotation speed. Therefore, it is possible to drive the electric motor 70 in all the rotation speed regions without necessity of unwinding the winding and without using flux weakening control that increases a current value more than necessary.

Figure 4:
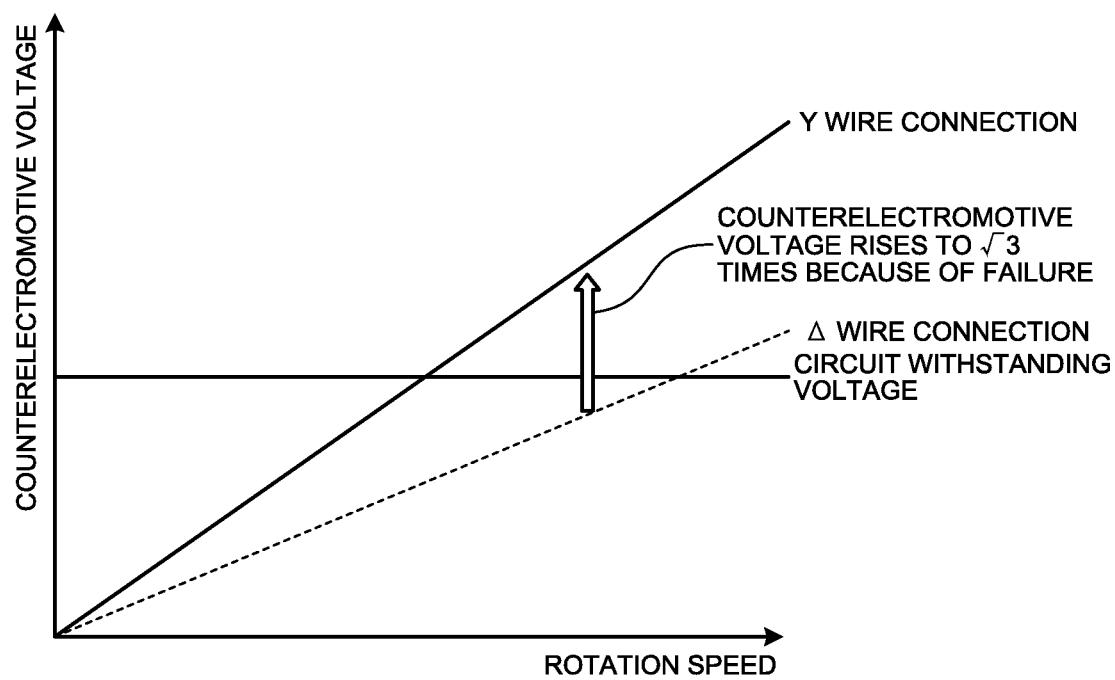
FIG. 4 is a diagram illustrating a relation between a rotation speed and a counterelectromotive voltage that depend on a winding state of the electric motor according to the first embodiment.

However, there is a possibility in that the switching unit 60 operates because of some abnormality and the winding state of the electric motor 70 sometimes returns to the Y wire connection from the Δ wire connection. Specifically, in a configuration in which all the switching devices 61 to 63 are switched by one switching signal output by the control unit 90, the winding state of the electric motor 70 returns to the Y wire connection when an error occurs in the switching signal. FIG. 4 is a diagram illustrating a relation between the rotation speed and the counterelectromotive voltage that depend on the winding state of the electric motor 70 according to the first embodiment. In FIG. 4, a relation between the rotation speed and the counterelectromotive voltage at the time when the winding state of the electric motor 70 is the Y wire connection is indicated by a solid line and a relation between the rotation speed and the counterelectromotive voltage at the time when the winding state of the electric motor 70 is the Δ wire connection is indicated by a broken line.

As explained above, when the winding state of the electric motor 70 returns to the Y wire connection from the Δ wire connection because of a failure due to some abnormality, the electric motor 70 is switched to the Y wire connection without the rotation speed of the electric motor 70 changed. Therefore, as illustrated in FIG. 4, an counterelectromotive voltage $\sqrt{3}$ times as large compared with the Δ wire connection is generated. The capacitor 40 is likely to be charged by the counterelectromotive voltage via the inverter 50. As illustrated in FIG. 4, when the winding state of the electric motor 70 is switched to the Y wire connection, the counterelectromotive voltage exceeds a circuit withstanding voltage at a low rotation speed compared with when the winding state is the Δ wire connection. An input of an overvoltage exceeding withstanding voltages of the components to the electric-motor driving device 100 is likely to lead to a failure of the electric-motor driving device 100.

When an overvoltage is generated, usually, the operation of the inverter 50 is stopped by the control unit 90 on the basis of an output of the voltage detecting unit 81. However, unless the rotation of the electric motor 70 is stopped, charging to the capacitor 40 via the diodes connected to the switching elements 51 to 56 configuring the inverter 50 cannot be stopped. Therefore, protection against the overvoltage cannot be performed. This is likely to lead to a failure of the electric-motor driving device 100.

Therefore, when determining on the basis of the output of the voltage detecting unit 81 that the overvoltage is generated, the control unit 90 turns on the switching elements 51 to 53 in the upper stage or turns on the switching elements 54 to 56 in the lower stage among the switching elements 51 to 56 configuring the inverter 50. Then, the wires of the electric motor 70 are short-circuited. Consequently, it is possible to reduce the inter-terminal voltage of the electric motor 70 to substantially zero. It is possible to protect the electric-motor driving device 100 from the overvoltage. When the wires of the electric motor 70 are short-circuited, energy that is generated by rotation is consumed by winding resistance in the electric motor 70. Therefore, it is possible to apply a braking force to the electric motor 70. It is possible to quickly stop the electric motor 70.

Figure 5:
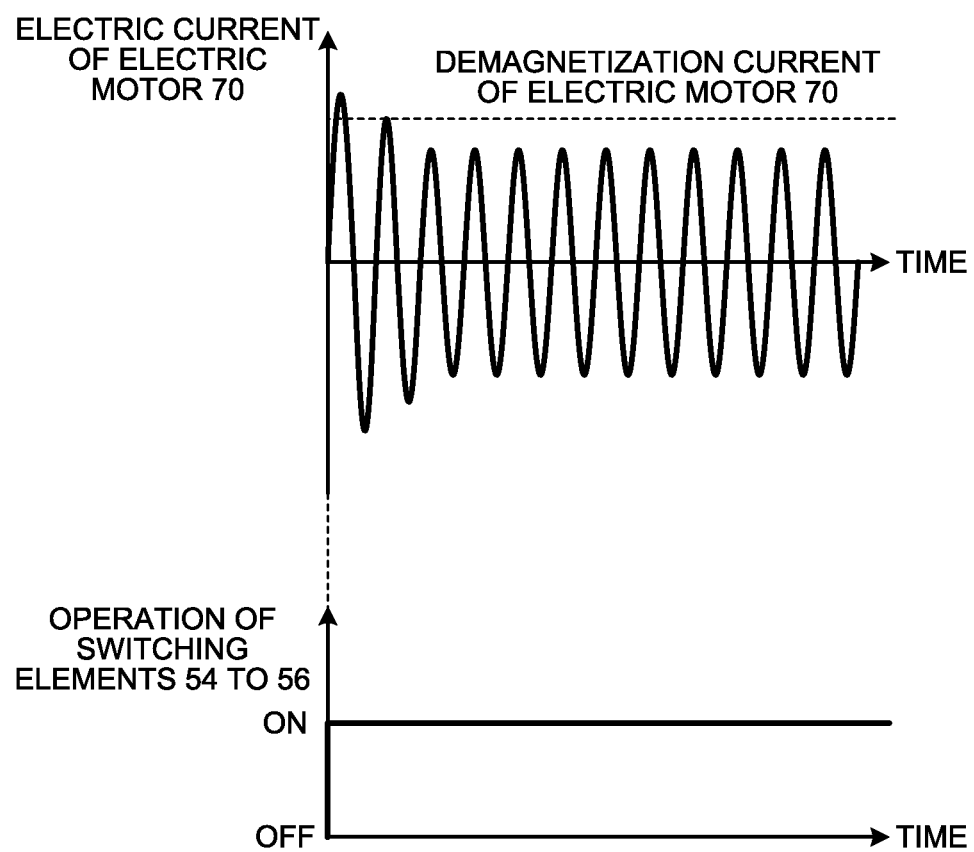
FIG. 5 is a diagram representing an operation waveform in a method of preventing a counterelectromotive voltage according to the first embodiment.
Figure 6:
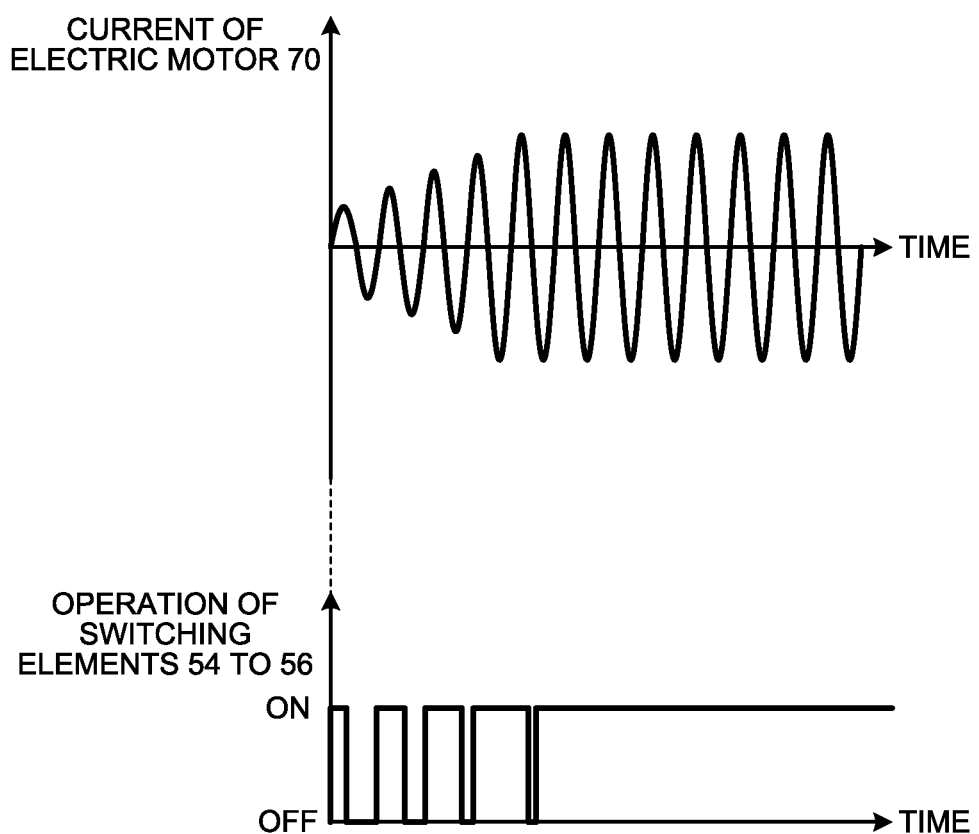
FIG. 6 is a diagram representing an operation waveform in another method of preventing a counterelectromotive voltage according to the first embodiment.

An example in which the control unit 90 turns on the switching elements 54 to 56 is explained below with reference to FIG. 5 and FIG. 6. FIG. 5 is a diagram representing an operation waveform in a method of preventing a counterelectromotive voltage according to the first embodiment. FIG. 6 is a diagram representing an operation waveform in another method of preventing a counterelectromotive voltage according to the first embodiment.

The wires of the electric motor 70 can be short-circuited by turning on the switching elements 54 to 56. As illustrated in FIG. 5, a rush current instantaneously flows when the electric motor 70 is short-circuited by simply turning on all the switching elements 54 to 56. In this case, as illustrated in FIG. 5, when an electric current of the electric motor 70 exceeds a demagnetizing current, the permanent magnet included in the electric motor 70 is irreversibly demagnetized, leading to performance deterioration of the electric motor 70. Destruction or the like of the switching elements 51 to 56 due to the rush current is also likely to be caused.

Therefore, as illustrated in FIG. 6, the control unit 90 repeats turning on and off of the switching elements 54 to 56 to thereby repeat short-circuit and release of the terminals of the electric motor 70 and control a short-circuit time to gradually become longer. With such a protection operation, it is possible to reduce an electric current flowing to the electric motor 70. It is possible to prevent an overvoltage from being applied to the capacitor 40 and the inverter 50. It is possible to protect the electric-motor driving device 100.

However, because the capacitance of the capacitor 40 in the electric-motor driving device 100 is usually as high as several thousand microfarads, charging of the capacitor 40 is delayed according to the capacitance, although an inter-terminal voltage of the electric motor 70 is an overvoltage. Therefore, the electric-motor driving device 100 is likely to be broken by the overvoltage before the control unit 90 determines on the basis of a detection result of the voltage detecting unit 81 that the inter-terminal voltage is the overvoltage.

Figure 7:
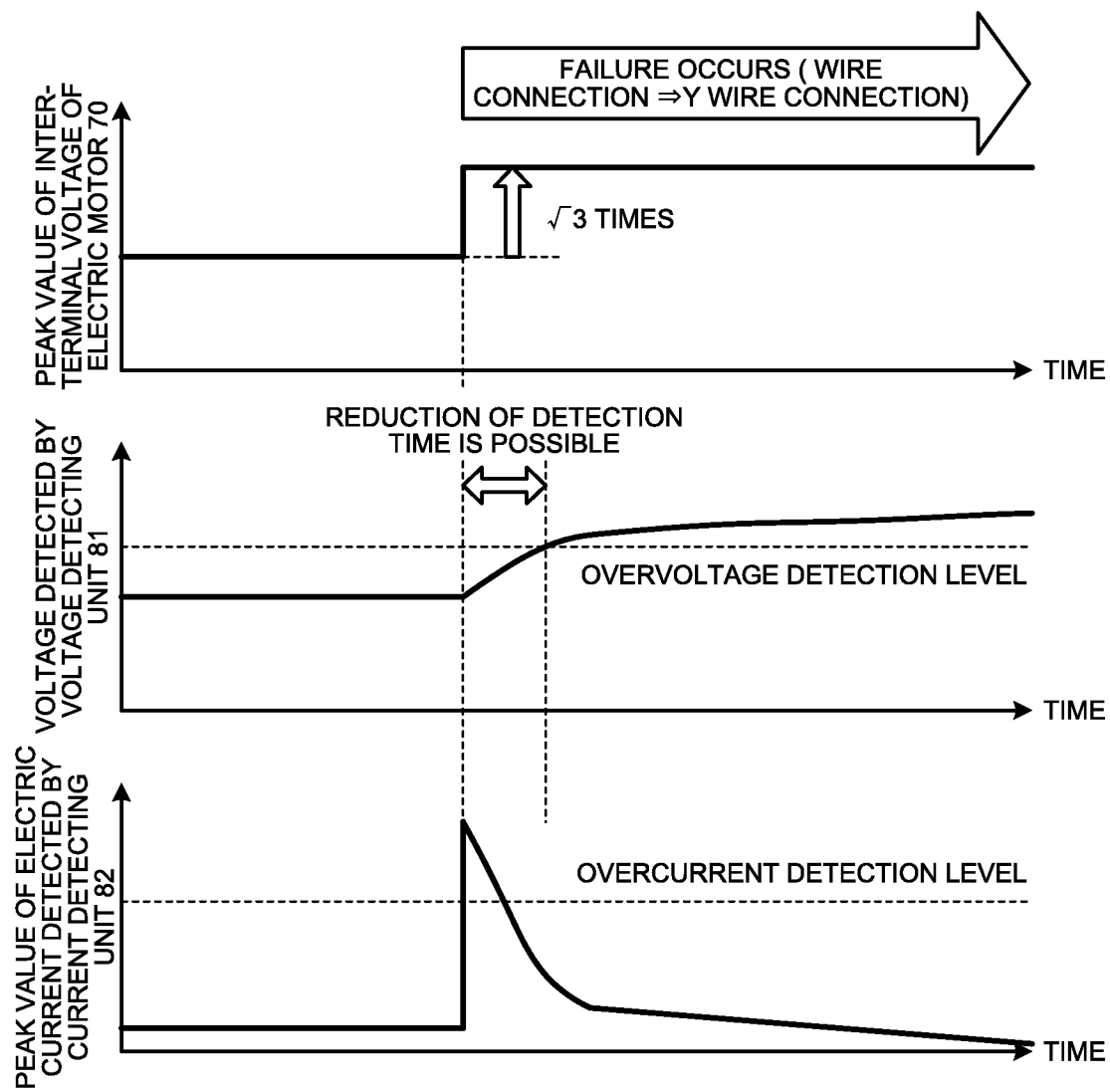
FIG. 7 is a diagram illustrating the operation of the electric-motor driving device during a failure of a switching unit according to the first embodiment.

FIG. 7 is a diagram illustrating the operation of the electric-motor driving device 100 during a failure of the switching unit 60 according to the first embodiment. In FIG. 7, a graph illustrating a temporal change of a peak value of the inter-terminal voltage of the electric motor 70, a graph illustrating a temporal change of a voltage detected by the voltage detecting unit 81, and a graph illustrating a temporal change of a peak value of an electric current detected by the current detecting unit 82 are illustrated in order from the top with time axes aligned.

Operation performed when the switching unit 60 switches the winding state of the electric motor 70 from the Δ wire connection to the Y wire connection during driving operation because of a failure such as occurrence of noise is explained with reference to FIG. 7. The winding state of the electric motor 70 is switched to the Y wire connection, whereby the peak value of the inter-terminal voltage of the electric motor 70 increases by √3 times. Then, the voltage of the voltage detecting unit 81 starts to gradually rise with the capacitance of the capacitor 40. When the voltage reaches a predetermined overvoltage detection level, the switching unit 60 can determine that the overvoltage is generated. However, as explained above, a delay occurs before detection. On the other hand, a larger rush current flows to the current detecting unit 82 as a difference between the voltage of the capacitor 40 and the inter-terminal voltage of the electric motor 70 is larger. Therefore, an electric current, a peak value of which reaches a predetermined overcurrent detection level, illustrated in FIG. 7, instantaneously flows when a failure occurs. The current detecting unit 82 detects the electric current and the control unit 90 performs a protection operation for preventing a counterelectromotive voltage. Consequently, it is possible to protect the electric-motor driving device 100 from the overvoltage more quickly than when the control unit 90 performs the protection operation using the voltage detecting unit 81. Consequently, it is possible to obtain the electric-motor driving device 100 with high reliability.

Concerning the current detecting unit 82, to prevent misdetection due to external noise or the like, the influence of the noise can be eliminated using a filter such as a low-pass filter (LPF). When the filter is used, the filter is desirably set to a time constant in a range not affecting the control of the electric motor 70 by the control unit 90. Specifically, by setting the filter to a time constant equal to or smaller than a control period for the control unit 90 to perform control of the electric motor 70, it is possible to eliminate the influence of the noise without affecting the control.

Figure 8:
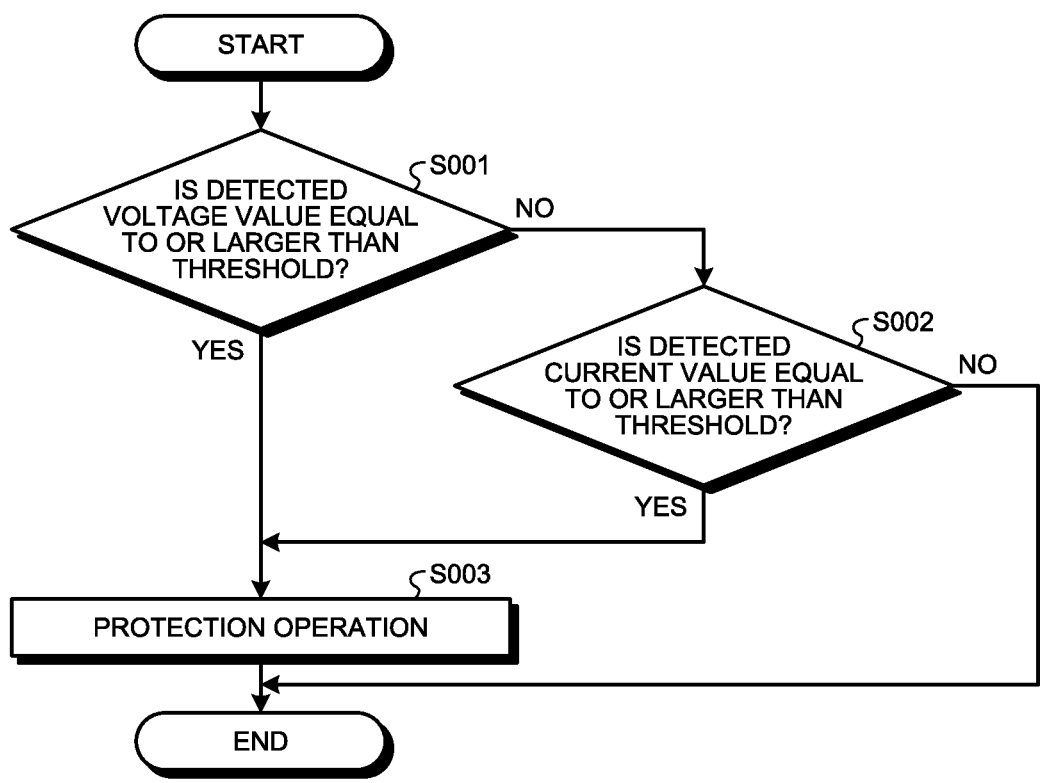
FIG. 8 is a flowchart for explaining control in the electric-motor driving device according to the first embodiment.

FIG. 8 is a flowchart for explaining control in the electric-motor driving device 100 according to the first embodiment. The operation of the control unit 90 is explained below with reference to the flowchart of FIG. 8.

First, the voltage detecting unit 81 detects a voltage value charged in the capacitor 40. The control unit 90 determines whether the detected voltage value is equal to or larger than a threshold (step S001). The threshold at step S001 is the overvoltage detection level explained above. When determining that the detected voltage value is equal to or larger than the threshold (Yes at step S001), the control unit 90 determines that some abnormality has occurred in the switching unit 60 and proceeds to processing at step S003. When determining that the detected voltage value is smaller than the threshold (No at step S001), because an abnormality determinable on the basis of the voltage value charged in the capacitor 40 has not occurred, the control unit 90 shifts to processing at step S002.

At step S002, the control unit 90 determines whether a current value detected by the current detecting unit 82 is equal to or larger than a threshold (step S002). The threshold at step S002 is the overcurrent detection level explained above. When determining that the detected current value is equal to or larger than the threshold (Yes at step S002), the control unit 90 determines that some abnormality has occurred in the switching unit 60 and proceeds to the processing at step S003. When determining that the detected current value is smaller than the threshold (No at step S002), because abnormality determinable by the detected voltage value and the detected current value has not occurred, the control unit 90 ends the processing.

When determining at step S001 or step S002 that some abnormality has occurred in the switching unit 60, the control unit 90 carries out the protection operation against a counterelectromotive voltage, that is, a regenerative voltage (step S003).

By repeating the flowchart of FIG. 8, when the voltage value or the current value is equal to or larger than the threshold thereof, the control unit 90 carries out the protection operation.

The protection operation for simultaneously turning on the switching elements 51 to 53 or the switching elements 54 to 56 at step S003 can be executed on the basis of a detection value of either the voltage value or the current value detected by the detecting unit 80.

By executing the protection operation explained above, even when an overvoltage is applied to the capacitor 40 because of an abnormality of the switching unit 60, the capacitor 40 is not excessively charged. Therefore, a protecting function is improved. It is possible to prevent breakage of the capacitor 40.

Note that, in FIG. 6, an example of the protection operation is illustrated. However, the protection operation is not limited to this as long as the protection operation is capable of preventing an overvoltage from being applied to the capacitor 40 and the inverter 50.

In general, diodes are used for the rectifying elements 31 to 34 configuring the rectifying unit 30. However, metal oxide semiconductor field effect transistors (MOSFETs) or the like can be used and turned on according to the polarity of the alternating-current power supply 10 to perform rectification.

The switching elements 51 to 56 configuring the inverter 50 can be configured by insulated gate bipolar transistors (IGBTs) in which circulation diodes are connected in parallel or MOSFETS in which circulation diodes are connected in parallel. However, any switching elements can be used as long as the switching elements can perform switching. When the MOSFETs are used, because the MOSFETs include parasitic diodes due to its structure, the same effect can be obtained even if the circulation diodes are not intentionally connected in parallel.

Concerning a material forming each of the rectifying elements 31 to 34 and the switching elements 51 to 56, by using not only silicon (Si) but also materials such as silicon carbide (SiC), gallium nitride (GaN), and diamond, which are wide bandgap semiconductors, it is possible to further reduce an energy loss.

The switching unit 60 can use any scheme as long as it is possible to switch the winding state of the electric motor 70. Therefore, as the switching devices 61 to 63, rather than the "c" contact-type relays illustrated in FIG. 1, relays of a "a" contact and a "b" contact can be combined to be configured such that operation equivalent to the operation of the switching devices 61 to 63 illustrated in FIG. 1 can be realized. The switching unit 60 can be configured by not only the relays but also electromagnetic contactors such as contactors, switching elements including semiconductors, or the like as long as the winding state of the electric motor 70 can be switched. Note that, by using mechanical relays or the like in the switching unit 60, a conduction loss in an ON state caused when the switching unit 60 is configured by the semiconductors can be reduced. Therefore, it is possible to obtain the electric-motor driving device 100 with higher efficiency.

The voltage detecting unit 81 and the current detecting unit 82 are not limited to the positions illustrated in FIG. 1 and can be provided in any positions as long as information necessary for the control unit 90 to operate is detectable. Specifically, the voltage detecting unit 81 can be set in a position where a voltage divided by a resistor provided in parallel to the capacitor 40 is detected. Then, the voltage of the capacitor 40, that is, a direct-current voltage on the input side of the inverter 50 can be converted into a voltage of 5 V or less that is detectable by a microcomputer to be detected by the voltage detecting unit 81. The current detecting unit 82 can be set as a sensor that detects an electric current between the inverter 50 and the electric motor 70 rather than being provided in the position illustrated in FIG. 1. The current detecting unit 82 can detect an electric current flowing to the electric motor 70.

The control unit 90 can be configured by a discrete system such as a central processing unit (CPU), a digital signal processor (DSP), or a microcomputer. Besides, the control unit 90 can be configured by an electric circuit element such as an analog circuit or a digital circuit.

With the electric-motor driving device 100 according to the first embodiment, by turning on the switching elements 51 to 53 in the upper stage or the switching elements 54 to 56 in the lower stage among the switching elements 51 to 56 configuring the inverter 50 to short-circuit the terminals of the electric motor 70, it is possible to protect the electric-motor driving device 100 from the counterelectromotive voltage of the electric motor 70 without operating the switching unit 60.

That is, with the electric-motor driving device 100 according to the first embodiment, when an abnormality occurs, it is possible to prevent occurrence of an overvoltage and an overcurrent by, without operating the switching unit 60, controlling the inverter 50 that drives the electric motor 70. Therefore, even when relays that are small and inexpensive and have poor responsiveness are used for the switching unit 60, it is possible to quickly and surely protect the electric-motor driving device 100 from an overvoltage and an overcurrent by performing protection using the inverter 50. Further, an effect that it is possible to manufacture the electric-motor driving device 100 according to the first embodiment small in size and light in weight is also obtained.

Figure 9:
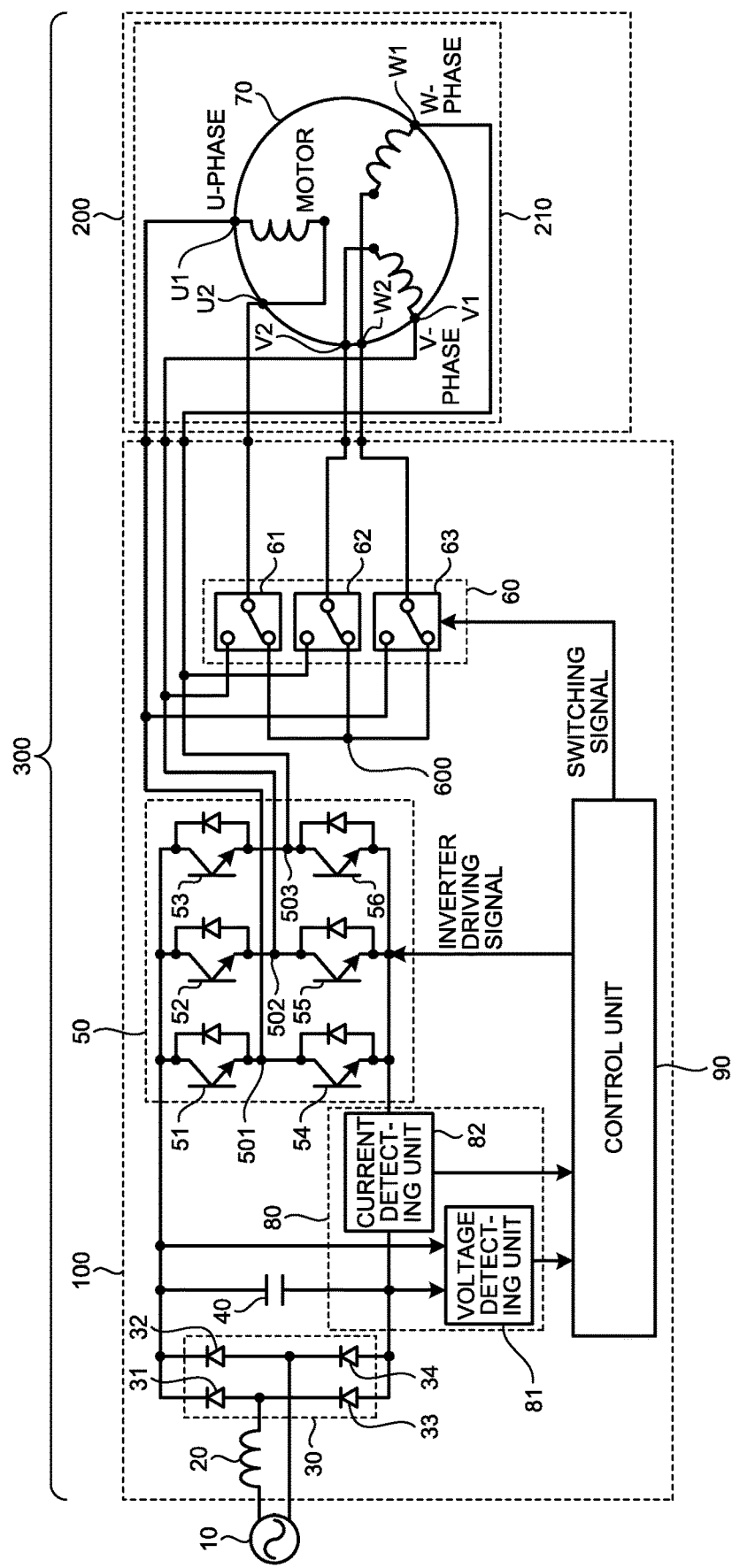
FIG. 9 is a diagram illustrating a configuration example of a refrigeration-cycle application apparatus according to the first embodiment.

FIG. 9 is a diagram illustrating a configuration example of a refrigeration-cycle application apparatus 300 according to the first embodiment. The refrigeration-cycle application apparatus 300 includes the electric-motor driving device 100 according to the first embodiment and a refrigeration cycle 200 including the electric motor 70 driven by the electric-motor driving device 100. Specifically, the electric motor 70 is included in a compressor 210 included in the refrigeration cycle 200.

In the refrigeration-cycle application apparatus 300, operation having a low rotation speed, a light load, and a relatively long operation time is executed with the winding state of the electric motor 70 switched to the Y wire connection. Operation having a high rotation speed and a high load is executed with the winding state of the electric motor 70 switched to the Δ wire connection. In such a case, when the winding state of the electric motor 70 is the Δ wire connection, even when a failure due to an abnormality of the switching unit 60 occurs and the winding state changes to the Y wire connection, it is possible to surely protect the electric-motor driving device 100 from an overvoltage. It is possible to obtain the refrigeration-cycle application apparatus 300 with high reliability.

Second Embodiment

Figure 10:
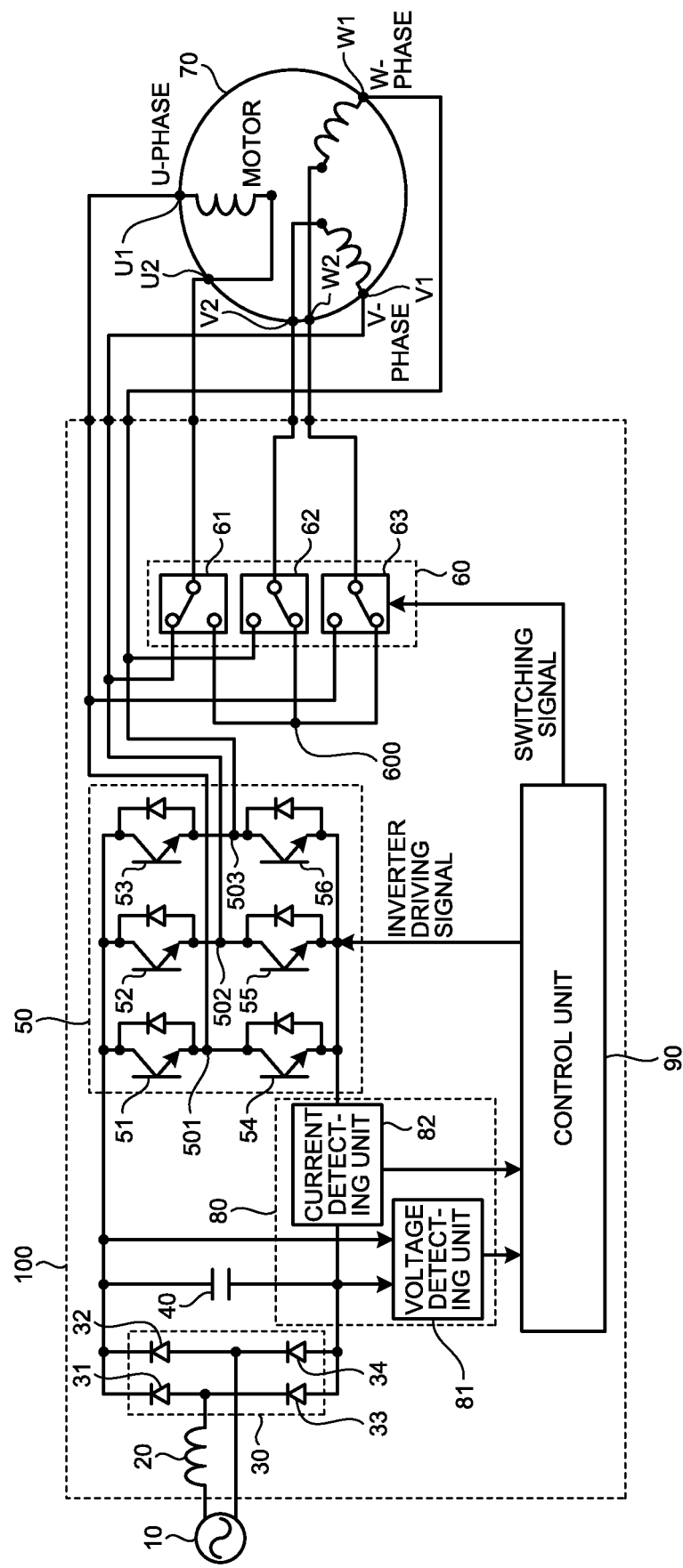
FIG. 10 is a diagram illustrating a configuration example of an electric-motor driving device according to a second embodiment of the present invention.
Figure 11:
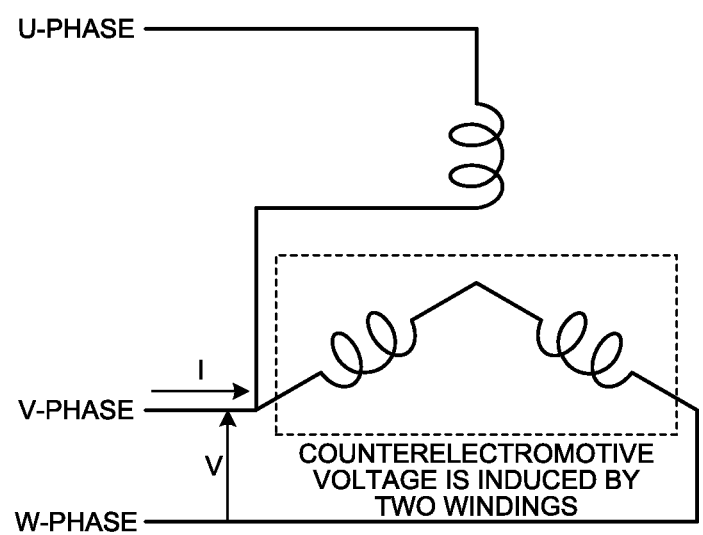
FIG. 11 is a diagram representing an example of a failure state of a switching unit according to the second embodiment.
Figure 12:
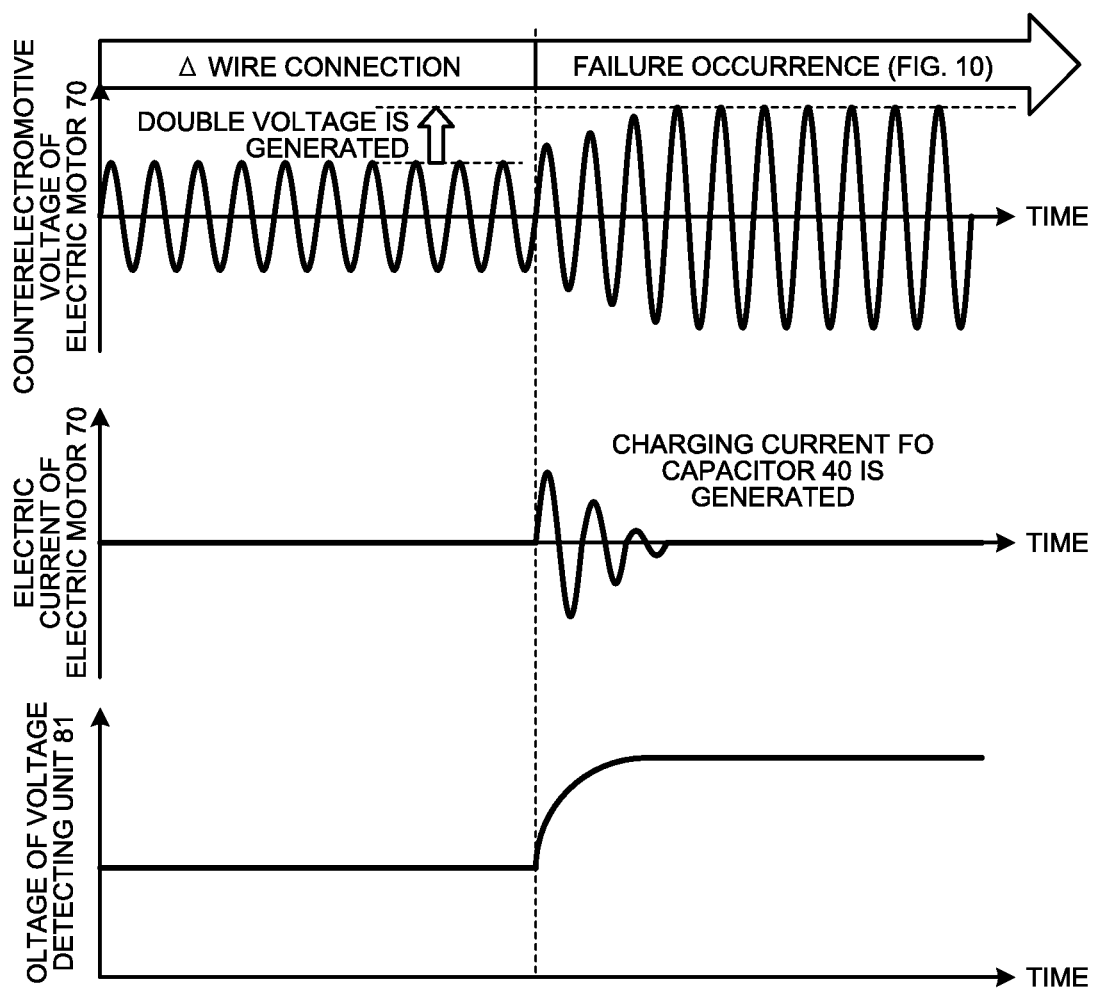
FIG. 12 is a diagram representing an operation waveform during a failure according to the second embodiment.
Figure 13:
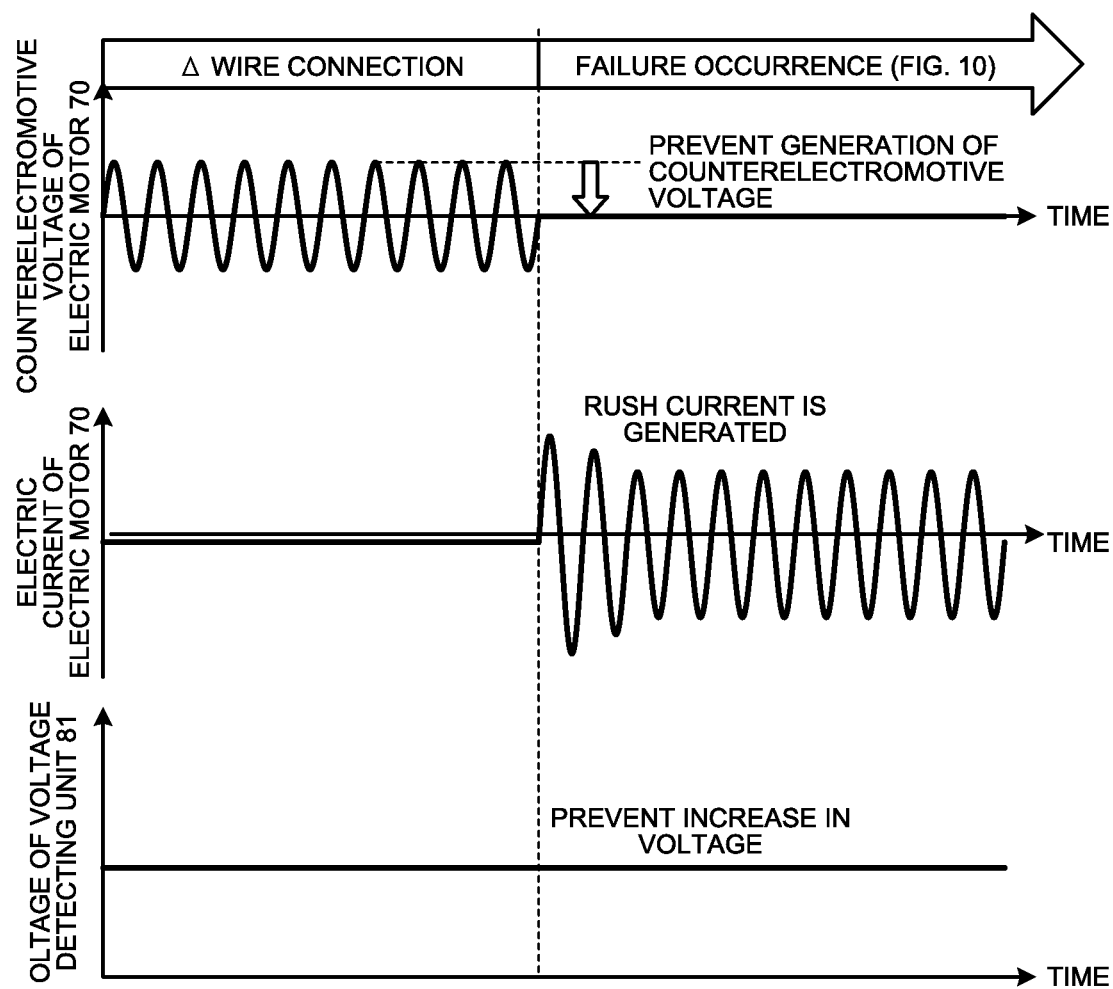
FIG. 13 is a diagram representing an operation waveform at the time when three switching elements are simultaneously turned on during the failure according to the second embodiment.
Figure 14:
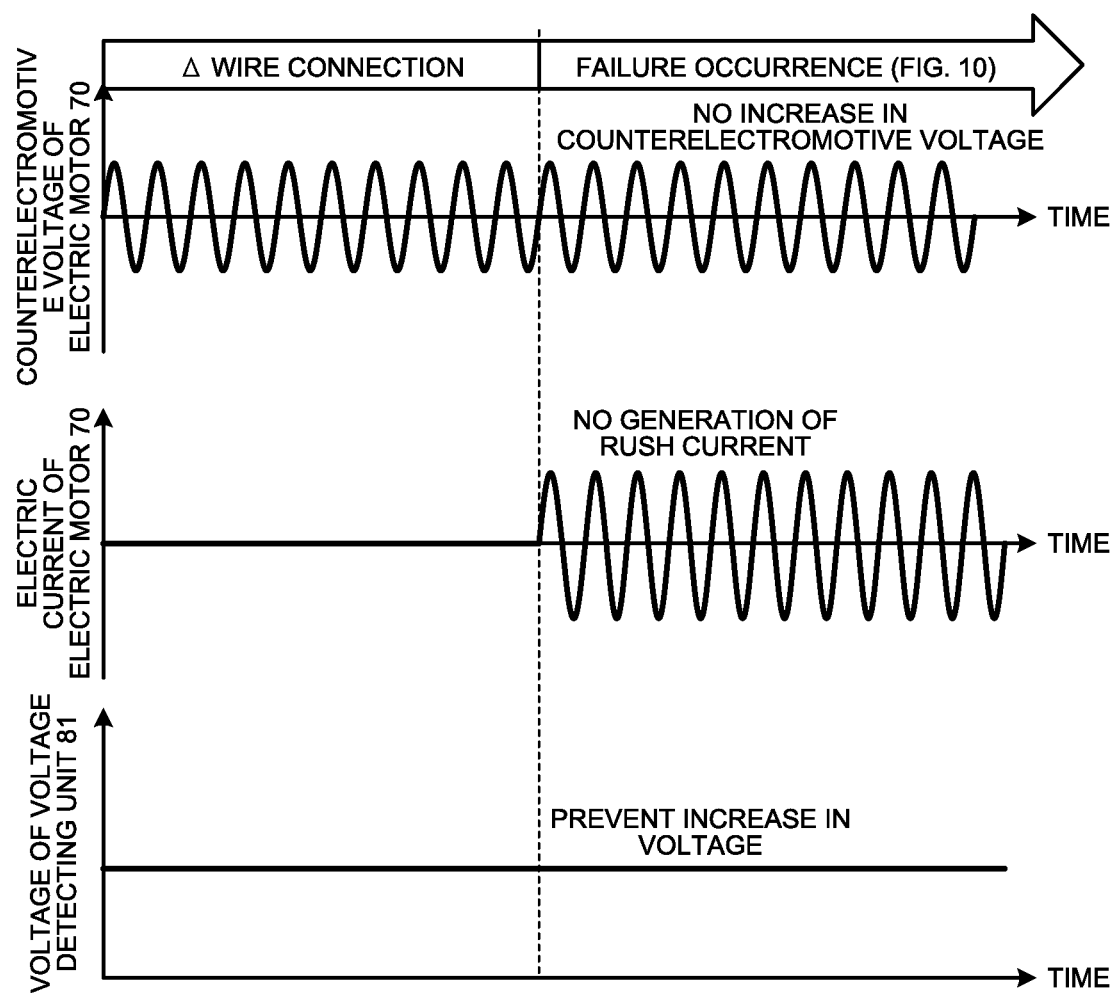
FIG. 14 is a diagram representing an operation waveform at the time when two switching elements are simultaneously turned on during the failure according to the second embodiment.

FIG. 10 is a diagram illustrating a configuration example of the electric-motor driving device 100 according to a second embodiment of the present invention. FIG. 10 is a diagram illustrating a failure state in which an operating direction of the switching device 61 configuring the switching unit 60 in the first embodiment is different from an operating direction of the other switching devices 62 and 63. FIG. 11 is a diagram representing an example of a failure state of the switching unit 60 according to the second embodiment. FIG. 12 is a diagram representing an operation waveform during a failure according to the second embodiment. FIG. 13 is a diagram representing an operation waveform at the time when the three switching elements 54 to 56 are simultaneously turned on during the failure according to the second embodiment. FIG. 14 is a diagram representing an operation waveform at the time when the two switching elements 55 and 56 are simultaneously turned on during the failure according to the second embodiment.

The switching devices 61 to 63 are configured such that all the switching devices 61 to 63 are originally switched to the same direction to thereby switch the winding state of the electric motor 70 to the Y wire connection or the Δ wire connection. However, when the switching devices 61 to 63 are configured by electromagnetic contactors represented by relays, an abnormality such as contact welding could occur. When the switching devices 61 to 63 are configured by semiconductors, an abnormality such as a release or short-circuit failure could occur. When such an abnormality occurs, a failure occurs in which one switching device among the switching devices 61 to 63 is switched to a direction different from the direction of the other switching devices. The winding state of the electric motor 70 in that case is simply represented in FIG. 11.

In FIG. 11, in a voltage V between V and W phases of the electric motor 70, an counterelectromotive voltage is induced because a magnetic flux of the permanent magnet crosses two windings. Compared with when the winding state of the electric motor 70 is the Δ wire connection, a double voltage is generated as illustrated in FIG. 12. In this case, a larger overvoltage is applied than when the Δ wire connection changes to the Y wire connection and a √3 times counterelectromotive voltage is generated. There is an increasing concern about breakage of the electric-motor driving device 100.

When an overvoltage is generated, among the switching elements 51 to 56 configuring the inverter 50, when the control unit 90 turns on the switching elements 51 to 53 in the upper stage or turns on the switching elements 54 to 56 in the lower stage as in the first embodiment, the wires of the electric motor 70 are short-circuited. Therefore, it is possible to reduce an inter-terminal voltage, that is, a counterelectromotive voltage of the electric motor 70 to substantially zero. Consequently, it is possible to protect the electric-motor driving device 100 from the overvoltage. However, to protect the electric motor 70 from a rush current due to short-circuit, as explained in the first embodiment, it is necessary to gradually increase a short-circuit time while repeating short-circuit and release and finally shift to a short-circuit state.

However, in a situation in which an overvoltage twice as large compared with the case of the Δ wire connection is instantaneously generated because of an abnormality of the switching unit 60 during operation, a rise of a voltage is quick. Accordingly, even when a short-circuiting operation and a releasing operation of the switching elements 51 to 53 or the switching elements 54 to 56 are repeated, a rush current illustrated in FIG. 13 is generated and an electric current of the electric motor 70 increases. A trouble such as irreversible demagnetization of the permanent magnet is likely to be caused.

Therefore, when it is known that an overvoltage is generated between a terminal of a V phase and a terminal of a W phase as illustrated in FIG. 11, among the switching elements 51 to 56 configuring the inverter 50, either the switching elements 52 and 53 or the switching elements 55 and 56 capable of short-circuiting the V phase and the W phase are simultaneously turned on. Consequently, it is possible to prevent the counterelectromotive voltage of the electric motor 70 from becoming excessive without causing a rush current as illustrated in FIG. 14.

By simultaneously turning on either the switching elements 52 and 53 or the switching elements 55 and 56, it is possible to prevent a rush current and an excessive counterelectromotive voltage. As illustrated in FIG. 14, a voltage equivalent to a counterelectromotive voltage during the Δ wire connection is always generated. However, it is not a problem because the voltage falls within a range of normal use. In order to further reduce the counterelectromotive voltage applied to the electric-motor driving device 100, because a steep voltage change during the occurrence of the abnormality in the switching unit 60 does not occur thereafter, the remaining switching element 51 or switching element 54 is turned on and off to repeat the short-circuiting operation and the releasing operation. Consequently, it is possible to further reduce the influence due to the counterelectromotive voltage while preventing the rush current.

In the second embodiment, the operation performed when the switching device 61 configuring the switching unit 60 breaks down as illustrated in FIG. 10 and FIG. 11 is explained. However, it goes without saying that, when the other switching device 62 or switching device 63 break down, the same effects as the effects explained above are obtained by short-circuiting the switching elements 51 to 56 configuring the inverter 50 to short-circuit the terminals of the electric motor 70 corresponding to phases between which the largest overvoltage is generated.

Figure 15:
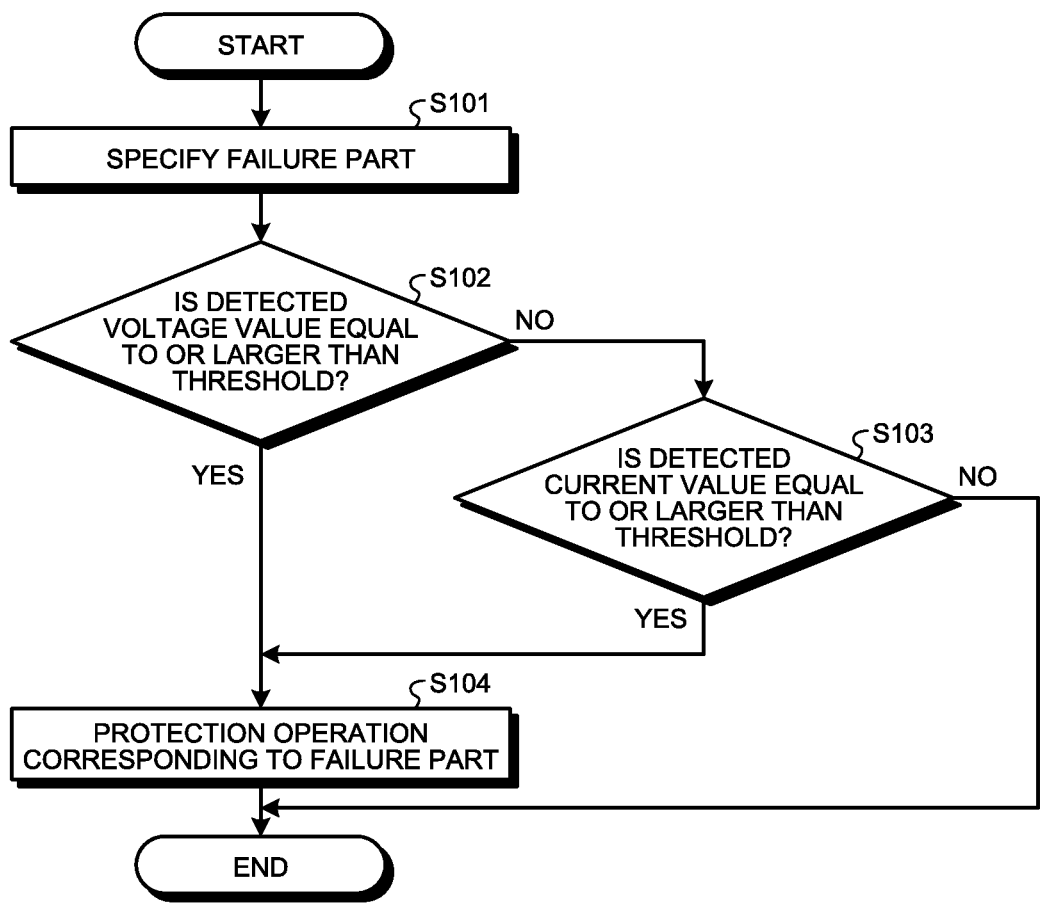
FIG. 15 is a flowchart for explaining control in the electric-motor driving device according to the second embodiment.

FIG. 15 is a flowchart for explaining control in the electric-motor driving device 100 according to the second embodiment. The operation of the control unit 90 is explained below with reference to the flowchart of FIG. 15.

First, the control unit 90 detects on the basis of an output of the voltage detecting unit 81 or the current detecting unit 82 that only a specific phase of the electric motor 70 is imbalanced. The control unit 90 can detect on the basis of a maximum of voltage values detected by the voltage detecting unit 81 or a maximum of current values detected by the current detecting unit 82 that the specific phase of the electric motor 70 is imbalanced. Consequently, the control unit 90 can specify terminals between which the counterelectromotive voltage of the electric motor 70 is the largest. Consequently, the control unit 90 can specify a failure part of the switching unit 60 (step S101). Thereafter, the control unit 90 shifts to processing at step S102.

Subsequently, the voltage detecting unit 81 detects a voltage value charged in the capacitor 40. The control unit 90 determines whether the detected voltage value is equal to or larger than a threshold (step S102). The threshold at step S102 is the overvoltage detection level in the first embodiment. When determining that the detected voltage value is equal to or larger than the threshold (Yes at step S102), the control unit 90 determines that some abnormality has occurred in the switching unit 60 and proceeds to processing at step S104. When determining that the detected voltage value is smaller than the threshold (No at step S102), because an abnormality determinable on the basis of the voltage value charged in the capacitor 40 has not occurred, the control unit 90 shifts to processing at step S103.

At step S103, the control unit 90 determines whether a current value detected by the current detecting unit 82 is equal to or larger than a threshold (step S103). The threshold at step S103 is in the overcurrent detection level in the first embodiment. When determining that the detected current value is equal to or larger than the threshold (Yes at step S103), the control unit 90 determines that some abnormality has occurred in the switching unit 60 and proceeds to the processing at step S104. When determining that the detected current value is smaller than the threshold (No at step S103), because abnormality determinable by the detected voltage value and the detected current value has not occurred, the control unit 90 ends the processing.

When it is determined at step S102 or step S103 that an overvoltage or an overcurrent is generated, some abnormality is considered to have occurred in the switching unit 60. Therefore, as explained above, by short-circuiting, on the basis of the failure part of the switching unit 60 specified at step S101, terminals of the electric motor 70 corresponding to phases between which the largest overvoltage is generated, the control unit 90 carries out a protection operation for preventing occurrence of an overvoltage without causing a rush current (step S104). Note that the protection operation for simultaneously turning on either the switching elements 52 and 53 or the switching elements 55 and 56 at step S104 can be executed on the basis of a detection value of either the voltage value or the current value detected by the detecting unit 80.

By executing the protection operation explained above, when an overvoltage is applied to the capacitor 40 because of an abnormality of the switching unit 60, it is possible to prevent the capacitor 40 from being excessively charged. Further, by controlling the switching elements 51 to 56 of the inverter 50 according to a failure part of the switching unit 60 such that terminals of the electric motor 70 between which a counterelectromotive voltage is the largest are short-circuited, it is possible to prevent not only destruction of the capacitor 40 but also irreversible demagnetization of the electric motor 70.

Note that one of specific examples of the protection operation is explained above. However, the protection operation is not limited to this when the same effects are obtained.

In the above explanation, the configuration is explained in which the winding state of the electric motor 70 can be switched to the Y wire connection and the Δ wire connection. However, a configuration can be adopted in which a tap is set at an intermediate point of each winding of each phase and the winding state can be switched by changing the numbers of turns of the windings according to an operation state. With such a configuration, it goes without saying that the same effects as the effects explained above are obtained by controlling the switching elements 51 to 56 configuring the inverter 50.

The configurations explained in the embodiments indicate examples of the content of the present invention. The configurations can be combined with other publicly-known technologies. A part of the configurations can be omitted or changed in a range not departing from the spirit of the present invention.

The invention claimed is:

1. An electric-motor driving device comprising:
an inverter connected to terminals connected to windings of an electric motor including the windings, the inverter applying an alternating-current voltage to the electric motor;
switching circuitry being capable of switching a connection state between the terminals, the switching circuitry being connected to the terminals;
a detector to detect at least one of a voltage on an input side of the inverter and an electric current of the inverter; and
processing circuitry to determine, on a basis of a detection value detected by the detector, that an abnormality occurs in the switching circuitry and control the inverter to short-circuit at least two of the terminals.

2. The electric-motor driving device according to claim 1, wherein, when determining that an abnormality occurs in the switching circuitry, the processing circuitry controls the inverter to repeat short-circuit and release between the at least two of the terminals.

3. The electric-motor driving device according to claim 1, wherein the processing circuitry controls the inverter to short-circuit terminals between which a counterelectromotive voltage of the electric motor is largest among the terminals.

4. The electric-motor driving device according to claim 1, wherein a material of a switching element configuring the inverter is a wide bandgap semiconductor.

5. The electric-motor driving device according to claim 1, wherein the switching circuitry is capable of switching a winding state of the electric motor to Y wire connection or Δ wire connection.

6. A refrigeration-cycle application apparatus comprising:
the electric-motor driving device according to claim 1; and
a refrigeration cycle including the electric motor.

* * * * *